US012563029B2

(12) United States Patent
Uzun et al.

(10) Patent No.: US 12,563,029 B2
(45) Date of Patent: Feb. 24, 2026

(54) PROVISIONING CLOUD RESOURCE INSTANCES ASSOCIATED WITH A VIRTUAL CLOUD NETWORK

(71) Applicant: Oracle International Corporation, Redwood Shores, CA (US)

(72) Inventors: Burak Uzun, London (GB); Geetha Ravi, England (GB); Josko Petric, Wootton (GB)

(73) Assignee: Oracle International Corporation, Redwood Shores, CA (US)

( * ) Notice: Subject to any disclaimer, the term of this patent is extended or adjusted under 35 U.S.C. 154(b) by 66 days.

(21) Appl. No.: 18/353,991

(22) Filed: Jul. 18, 2023

(65) Prior Publication Data

US 2025/0030676 A1 Jan. 23, 2025

(51) Int. Cl.
*H04L 9/40* (2022.01)
*H04L 41/0806* (2022.01)

(52) U.S. Cl.
CPC ...... *H04L 63/0823* (2013.01); *H04L 41/0806* (2013.01)

(58) Field of Classification Search
None
See application file for complete search history.

(56) References Cited

U.S. PATENT DOCUMENTS 5,671,279 A 9/1997 Elgamal
5,699,431 A 12/1997 Van Oorschot et al.

7,272,714 B2 9/2007 Nagaratnam et al.
7,644,270 B1 1/2010 Cherukumudi et al.
8,176,328 B2 5/2012 Chen et al.
8,452,958 B2 5/2013 Sun et al.
9,172,543 B2 10/2015 Wnuk
(Continued)

FOREIGN PATENT DOCUMENTS

CN 112019477 A 12/2020
CN 114884963 A 8/2022
(Continued)

OTHER PUBLICATIONS

"About Azure Key Vault certificates", Retrieved from https://learn.microsoft.com/en-us/azure/key-vault/certificates/about-certificates, Feb. 8, 2023, pp. 1-8.

(Continued)

*Primary Examiner* — Scott B Christensen
(74) *Attorney, Agent, or Firm* — Invoke

(57) ABSTRACT

Techniques for provisioning a cloud resource instance associated with a virtual cloud network may include detecting a certificate bundle-retrieval trigger during a provisioning process for the cloud resource instance, and responsive to detecting the certificate bundle-retrieval trigger, sending, to an agent executing on a network interface linked to the cloud resource instance, a request for a certificate bundle for the cloud resource instance. Techniques may further include receiving the certificate bundle from the network interface. The certificate bundle may include a set of certificate authority (CA) certificates. Techniques may further include installing the certificate bundle in a storage medium associated with the cloud resource instance. Installing the certificate bundle may represent an operation of the provisioning process.

28 Claims, 8 Drawing Sheets

(56) References Cited

U.S. PATENT DOCUMENTS

| | | | |
|---|---|---|---|
| 9,197,630 B2 | 11/2015 | Sharif et al. | |
| 9,231,933 B1 | 1/2016 | Shenoy et al. | |
| 9,485,101 B2 | 11/2016 | Bowen | |
| 9,660,978 B1 | 5/2017 | Truskovsky et al. | |
| 9,680,813 B2 | 6/2017 | Sade et al. | |
| 9,794,249 B1 | 10/2017 | Truskovsky et al. | |
| 9,882,727 B1 | 1/2018 | Veladanda et al. | |
| 10,021,084 B2 | 7/2018 | Matthews et al. | |
| 10,212,147 B2 | 2/2019 | Buendgen et al. | |
| 10,425,401 B1 | 9/2019 | Pecen et al. | |
| 10,447,683 B1 | 10/2019 | Loladia et al. | |
| 10,469,518 B1 | 11/2019 | Natanzon et al. | |
| 10,621,577 B2 | 4/2020 | Castinado et al. | |
| 10,652,030 B1 | 5/2020 | Levy et al. | |
| 10,764,263 B2 | 9/2020 | Rossi | |
| 10,771,261 B1 | 9/2020 | Lazar et al. | |
| 10,812,276 B2 | 10/2020 | Bojjireddy et al. | |
| 10,848,323 B2 | 11/2020 | Barr et al. | |
| 11,153,103 B2 | 10/2021 | Fynaardt et al. | |
| 11,190,504 B1 | 11/2021 | Ah Kun et al. | |
| 11,196,570 B2 | 12/2021 | Borne-Pons et al. | |
| 11,310,059 B2 | 4/2022 | Leibmann et al. | |
| 11,362,843 B1 | 6/2022 | Jiang et al. | |
| 11,368,314 B2 | 6/2022 | Ray et al. | |
| 11,388,594 B2 | 7/2022 | Uy et al. | |
| 11,438,325 B2 | 9/2022 | Begun et al. | |
| 11,533,185 B1 | 12/2022 | Sharma et al. | |
| 11,627,123 B2 | 4/2023 | Stayskal et al. | |
| 11,706,038 B1 | 7/2023 | Thakore et al. | |
| 11,888,997 B1 | 1/2024 | Bowen et al. | |
| 12,088,738 B2 | 9/2024 | Rosenthol et al. | |
| 12,323,466 B1 | 6/2025 | Miseiko et al. | |
| 12,361,110 B1 | 7/2025 | Subramanian et al. | |
| 12,380,443 B1 | 8/2025 | Edwards et al. | |
| 2002/0007346 A1 | 1/2002 | Qiu et al. | |
| 2002/0174066 A1 | 11/2002 | Kleckner et al. | |
| 2003/0037234 A1 | 2/2003 | Fu et al. | |
| 2006/0047965 A1 | 3/2006 | Thayer | |
| 2006/0101510 A1 | 5/2006 | Kadyk et al. | |
| 2007/0005956 A1 | 1/2007 | Zilinskas et al. | |
| 2007/0016782 A1 | 1/2007 | Crall et al. | |
| 2007/0147619 A1* | 6/2007 | Bellows | H04W 12/041 |
| | | | 380/277 |
| 2010/0030897 A1 | 2/2010 | Stradling | |
| 2010/0325429 A1 | 12/2010 | Saha et al. | |
| 2011/0113239 A1 | 5/2011 | Fu et al. | |
| 2012/0036220 A1* | 2/2012 | Dare | H04L 67/04 |
| | | | 709/217 |
| 2012/0240192 A1 | 9/2012 | Orazi et al. | |
| 2012/0246466 A1* | 9/2012 | Salvarani | H04L 9/007 |
| | | | 713/156 |
| 2012/0278614 A1 | 11/2012 | Choi | |
| 2013/0086642 A1 | 4/2013 | Resch et al. | |
| 2014/0298419 A1 | 10/2014 | Boubez et al. | |
| 2015/0135299 A1 | 5/2015 | Liang et al. | |
| 2015/0215308 A1 | 7/2015 | Manolov et al. | |
| 2015/0279132 A1 | 10/2015 | Perotti | |
| 2015/0288528 A1 | 10/2015 | Cho et al. | |
| 2015/0334110 A1 | 11/2015 | Bishop et al. | |
| 2016/0277923 A1 | 9/2016 | Steffey et al. | |
| 2017/0039373 A1 | 2/2017 | Sasin et al. | |
| 2017/0126667 A1 | 5/2017 | Bishop et al. | |
| 2017/0171191 A1 | 6/2017 | Cignetti et al. | |
| 2017/0177324 A1 | 6/2017 | Frank et al. | |
| 2017/0222981 A1 | 8/2017 | Srivastav et al. | |
| 2017/0279807 A1 | 9/2017 | Bermudez | |
| 2017/0317837 A1 | 11/2017 | Alrawais et al. | |
| 2017/0338967 A1* | 11/2017 | Lewison | H04L 9/0643 |
| 2017/0373860 A1 | 12/2017 | Kshirsagar et al. | |
| 2018/0019993 A1 | 1/2018 | Kravitz et al. | |
| 2018/0083966 A1 | 3/2018 | Zhou et al. | |
| 2018/0102904 A1 | 4/2018 | Lin et al. | |
| 2018/0287804 A1 | 10/2018 | Geisbush | |
| 2019/0026804 A1 | 1/2019 | Yin | |
| 2019/0149342 A1* | 5/2019 | Fynaardt | H04L 9/0891 |
| | | | 713/156 |
| 2019/0165950 A1 | 5/2019 | Ibrahim | |
| 2019/0166635 A1 | 5/2019 | McColgan et al. | |
| 2019/0347406 A1* | 11/2019 | Lev-Ran | G06F 21/51 |
| 2019/0349402 A1* | 11/2019 | Shukla | H04L 63/0263 |
| 2019/0356494 A1 | 11/2019 | Chmara et al. | |
| 2019/0356817 A1 | 11/2019 | Bush et al. | |
| 2019/0363895 A1 | 11/2019 | Barr et al. | |
| 2019/0372783 A1 | 12/2019 | Martinez et al. | |
| 2020/0021575 A1 | 1/2020 | Rezvani et al. | |
| 2020/0092095 A1 | 3/2020 | Yang et al. | |
| 2020/0150972 A1 | 5/2020 | Ketkar et al. | |
| 2020/0274718 A1 | 8/2020 | Hwang et al. | |
| 2020/0274862 A1 | 8/2020 | Varvarezis et al. | |
| 2020/0382323 A1 | 12/2020 | Keselman et al. | |
| 2020/0396089 A1 | 12/2020 | Guo et al. | |
| 2021/0034767 A1 | 2/2021 | Free et al. | |
| 2021/0126801 A1 | 4/2021 | Nix | |
| 2021/0152547 A1 | 5/2021 | Barhudarian et al. | |
| 2021/0211307 A1 | 7/2021 | Statia et al. | |
| 2021/0218723 A1 | 7/2021 | Lekov et al. | |
| 2021/0297259 A1 | 9/2021 | Rahn et al. | |
| 2021/0328814 A1 | 10/2021 | Wei et al. | |
| 2021/0392002 A1 | 12/2021 | Gray et al. | |
| 2021/0409403 A1 | 12/2021 | Lewin et al. | |
| 2021/0409409 A1 | 12/2021 | Palanisamy | |
| 2022/0014522 A1 | 1/2022 | Thomas et al. | |
| 2022/0038894 A1 | 2/2022 | Yoon et al. | |
| 2022/0116229 A1 | 4/2022 | Jones et al. | |
| 2022/0123951 A1 | 4/2022 | Lutz et al. | |
| 2022/0150238 A1 | 5/2022 | Bhalerao | |
| 2022/0239503 A1 | 7/2022 | Mallikarjuna et al. | |
| 2022/0393886 A1 | 12/2022 | Williams et al. | |
| 2023/0007474 A1 | 1/2023 | Ni et al. | |
| 2023/0032867 A1 | 2/2023 | Peddada et al. | |
| 2023/0049095 A1 | 2/2023 | Rangaraj | |
| 2023/0062888 A1 | 3/2023 | Colombano | |
| 2023/0109231 A1* | 4/2023 | Adogla | H04L 41/40 |
| | | | 709/223 |
| 2023/0121514 A1 | 4/2023 | Smith | |
| 2023/0208655 A1 | 6/2023 | Statia et al. | |
| 2023/0237155 A1* | 7/2023 | Jacquin | G06F 21/57 |
| | | | 713/168 |
| 2023/0291574 A1 | 9/2023 | Held et al. | |
| 2023/0291577 A1 | 9/2023 | Thai et al. | |
| 2023/0401307 A1* | 12/2023 | Pop | G06F 8/65 |
| 2023/0412397 A1 | 12/2023 | Gollent et al. | |
| 2024/0015508 A1 | 1/2024 | Yoon et al. | |
| 2024/0020373 A1 | 1/2024 | Ivanov et al. | |
| 2024/0031146 A1 | 1/2024 | Marosi-Bauer et al. | |
| 2024/0104192 A1 | 3/2024 | Kalle et al. | |
| 2024/0106886 A1 | 3/2024 | Roy et al. | |
| 2024/0121603 A1 | 4/2024 | Yoon et al. | |
| 2024/0146543 A1 | 5/2024 | Sahoo et al. | |
| 2024/0333640 A1 | 10/2024 | Shevade et al. | |
| 2024/0356763 A1* | 10/2024 | Goldberg | H04L 9/3247 |
| 2024/0372731 A1 | 11/2024 | Kobel et al. | |
| 2024/0388510 A1 | 11/2024 | Madtha et al. | |
| 2024/0430249 A1 | 12/2024 | Singh et al. | |
| 2025/0030561 A1 | 1/2025 | Long et al. | |
| 2025/0088373 A1 | 3/2025 | Uzun et al. | |
| 2025/0097211 A1 | 3/2025 | Uzun et al. | |
| 2025/0133401 A1 | 4/2025 | Lee et al. | |

FOREIGN PATENT DOCUMENTS

| | | |
|---|---|---|
| EP | 1251670 A2 | 10/2002 |
| EP | 2267970 A2 | 12/2010 |
| EP | 2854349 A1 | 4/2015 |
| EP | 3772208 B1 | 9/2024 |
| KR | 10-2011-0045459 A | 5/2011 |
| WO | 2006/122024 A2 | 11/2006 |
| WO | 2007/117293 A2 | 10/2007 |
| WO | 2022/103890 A1 | 5/2022 |
| WO | 2022/121461 A1 | 6/2022 |
| WO | 2022/133026 A1 | 6/2022 |

(56)       References Cited

FOREIGN PATENT DOCUMENTS

WO      2023/240360 A1     12/2023
WO      2025/059187 A1     3/2025

OTHER PUBLICATIONS

"About the Expressway", Aug. 17, 2022. pp. 1-12.
"Automated certificate management for TLS certificates", Retrieved from https://docs.servicenow.com/en-us/bundle/utah-it-operations-management/page/product/discovery/concept/automated-cert-requests.html, Retrieved on May 4, 2023, pp. 1-4.
"AWS Certificate Manager FAQs", Retrieved from https://aws.amazon.com/certificate-manager/faqs/, Retrieved on Mar. 24, 2023, pp. 1-17.
"Azure Instance Metadata Service", Retrieved from https://learn.microsoft.com/en-us/azure/virtual-machines/instance-metadata-service?tabs=windows, Mar. 15, 2023, pp. 1-42.
"Cisco Expressway Certificate Creation and Use Deployment Guide", Feb. 23, 2021, pp. 10.
"Deploying the CA bundle iApp", Retrieved from https://www.f5.com/pdf/deployment-guides/f5-ca-bundle-dg.pdf, Dec. 14, 2017, pp. 1-9.
"DigiCert Public Key Infrastructure (PKI) Platform", 2019, pp. 15.
"Get started with Key Vault certificates", Retrieved from https://learn.microsoft.com/en-us/azure/key-vault/certificates/certificate-scenarios, Retrieved on Feb. 1, 2023, pp. 1-6.
"High Availability using Patching and Rolling AP Upgrade on Cisco Catalyst 9800 Wireless Controllers", Copyright 2020, pp. 1-41.
"Manage Certificate Revocation Lists (CRLs)", Jul. 23, 2021, pp. 1-4.
"PKI secrets engine", Retrieved from https://developer.hashicorp.com/vault/docs/secrets/pki, Retrieved on May 4, 2023, pp. 1-3.
"Planning a certificate revocation list (CRL)", Retrieved from https://docs.aws.amazon.com/privateca/latest/userguide/crl-planning.html, Retrieved on Jul. 28, 2023, pp. 11.
"Release app updates with staged rollouts", Retrieved from https://support.google.com/googleplay/android-developer/answer/6346149?hl=en#zippy=%2Crelease-a-staged-rollout-to-specific-countries, Retrieved on Apr. 27, 2023, pp. 1-2.
"Release Your App Update in a Staged Rollout", Retrieved from https://developer.amazon.com/docs/app-submission/release-updates-in-staged-rollouts.html, Retrieved on Apr. 27, 2023, pp. 1-18.
"Rotate Security Certificates", Retrieved from https://www.cockroachlabs.com/docs/stable/rotate-certificates, Retrieved on May 4, 2023, pp. 1-6.
"Rotating the Root CA and Leaf Certificates", Retrieved from https://docs.pivotal.io/ops-manager/2-4/security/pcf-infrastructure/rotate-cas-and-leaf-certs.html, Nov. 5, 2020, pp. 1-9.
"Staged upgrade", Retrieved from https://www.ibm.com/docs/en/order-management-sw/9.4.0?topic=migrating-staged-upgrade, Mar. 2, 2021, pp. 1-3.
"Troubleshoot SSL certificates", Retrieved from https://cloud.google.com/load-balancing/docs/ssl-certificates/troubleshooting, Retrieved on Mar. 24, 2023, pp. 1-8.
"Tutorial: Configure certificate auto-rotation in Key Vault", Retrieved from https://learn.microsoft.com/en-us/azure/key-vault/certificates/tutorial-rotate-certificates, Feb. 27, 2023, pp. 1-6.
"Updating the CA bundle", Retrieved from https://docs.openshift.com/container-platform/4.9/security/certificates/updating-ca-bundle.html#ca-bundle-understanding_updating-ca-bundle, Retrieved on Mar. 24, 2023, pp. 1-2.
"Updating your private CA", Retrieved from https://docs.aws.amazon.com/privateca/latest/userguide/PCAUpdateCA.html, Retrieved on Mar. 24, 2023, pp. 1-4.

"Use self-managed SSL certificates", Retrieved from https://cloud.google.com/load-balancing/docs/ssl-certificates/self-managed-certs, Aug. 15, 2023, pp. 13.
"VSphere Security", vmware, Update 3, Mar. 21, 2023, pp. 1-426.
"Working with Hosts", Retrieved from https://docs.cloudstack.apache.org/projects/archived-cloudstack-administration/en/latest/hosts.html, Retrieved on Mar. 24, 2023, pp. 1-7.
Atutxa et al., "Improving efficiency and security of IIoT communications using in-network validation of server certificate", Computers in Industry, vol. 144, Jan. 2023, 103802, pp. 30.
Bigelow S.J., "Rolling deployment", Retrieved from https://www.techtarget.com/searchitoperations/definition/rolling-deployment, Jan. 2023, pp. 4.
Este-Gracias S., "Rotate your CA seamlessly using a Vault PKI", Retrieved from https://sestegra.medium.com/rotate-your-ca-seamlessly-using-a-vault-pki-9262228b4afb Sep. 29, 2022, pp. 1-49.
Ghanmi et al., "A Secure Data Storage in Multi-cloud Architecture Using Blowfish Encryption Algorithm", Advanced Information Networking and Applications, Mar. 2022, pp. 398-408.
Jamal F., "Zero Trust for SSH—Secure One-click Server Access for Software Engineering Teams", Retrieved from https://www.banyansecurity.io/blog/zero-trust-for-ssh/, Oct. 28, 2020, pp. 1-7.
Manjusha R. et al., "Secure Authentication and Access System for Cloud Computing Auditing Services Using Associated Digital Certificate", Indian Journal of Science and Technology, vol. 8 (S7), Apr. 2015, pp. 220-227.
Nexthop Team, "Updated: Creating a Certificate Revocation List Distribution Point for Your Internal Certification Authority", Retrieved from https://techcommunity.microsoft.com/t5/skype-for-business-blog/updated-creating-a-certificate-revocation-list-distribution/ba-p/620691, Dec. 17, 2012, pp. 10.
Rowley J., "Google's Moving Forward Together Proposals for Root Ca Policy: Rotating ICAS More Frequently", Retrieved from https://www.digicert.com/blog/googles-moving-forward-together-proposals-for-root-ca-policy, Mar. 22, 2023, pp. 1-11.
Subhayu, "Different Phases of a Certificate Lifecycle Management Process for a secure WPA2-Enterprise network", Certificate Lifecycle Management Oct. 6, 2022, pp. 16.
Ylonen et al., "Security of Automated Access Management Using Secure Shell (SSH)", NISTIR 7966 (Draft), Aug. 2014, pp. 43.
"What is Certificate Lifecycle Management", Retrieved from https://www.encryptionconsulting.com/different-phases-of-a-certificate-lifecycle-management-process/, Aug. 1, 2024, pp. 1-12.
Albert Wasef et al., DCS: An Efficient Distributed-Certificate-Service Scheme for Vehicular Networks, Feb. 2010, IEEE, vol. 59, Issue: 2, pp. 533-549. (Year: 2010).
Artem Dinaburg et al., Ether: Malware Analysis via Hardware Virtualization Extensions, Oct. 27, 2008, ACM, pp. 51-62. (Year: 2008).
Capt James M. Hayes, Secure In-band Update of Trusted Certificates, Aug. 6, 2002, IEEE, pp. 1-6. (Year: 2002).
Kumagai et al., "Distributed Public Key Certificate-Issuing Infrastructure for Consortium Certificate Authority Using Distributed Ledger Technology", Security and Communication Networks, vol. 2023, Article ID 9559439, Jun. 7, 2023, pp. 1-20.
Marco Anisetti et al., Test-Based Security Certification of Composite Services, Dec. 4, 2018, vol. 13, Issue 1, pp. 1-43. (Year: 2018).
Yu et al., "A Cloud Certificate Authority Architecture for Virtual Machines with Trusted Platform Module", 2015 IEEE 17th International Conference on High Performance Computing and Communications, 2015 IEEE 7th International Symposium on Cyberspace Safety and Security, and 2015 IEEE 12th International Conference on Embedded Software and Systems, 2015, pp. 1377-1380.
Yi, Seunghee, (WO2023/227228 , "Method and Apparatus for Canary deployment in Gnodeb,"), Nov. 30, 2023. pp. 1-17. (Year: 2023).

* cited by examiner

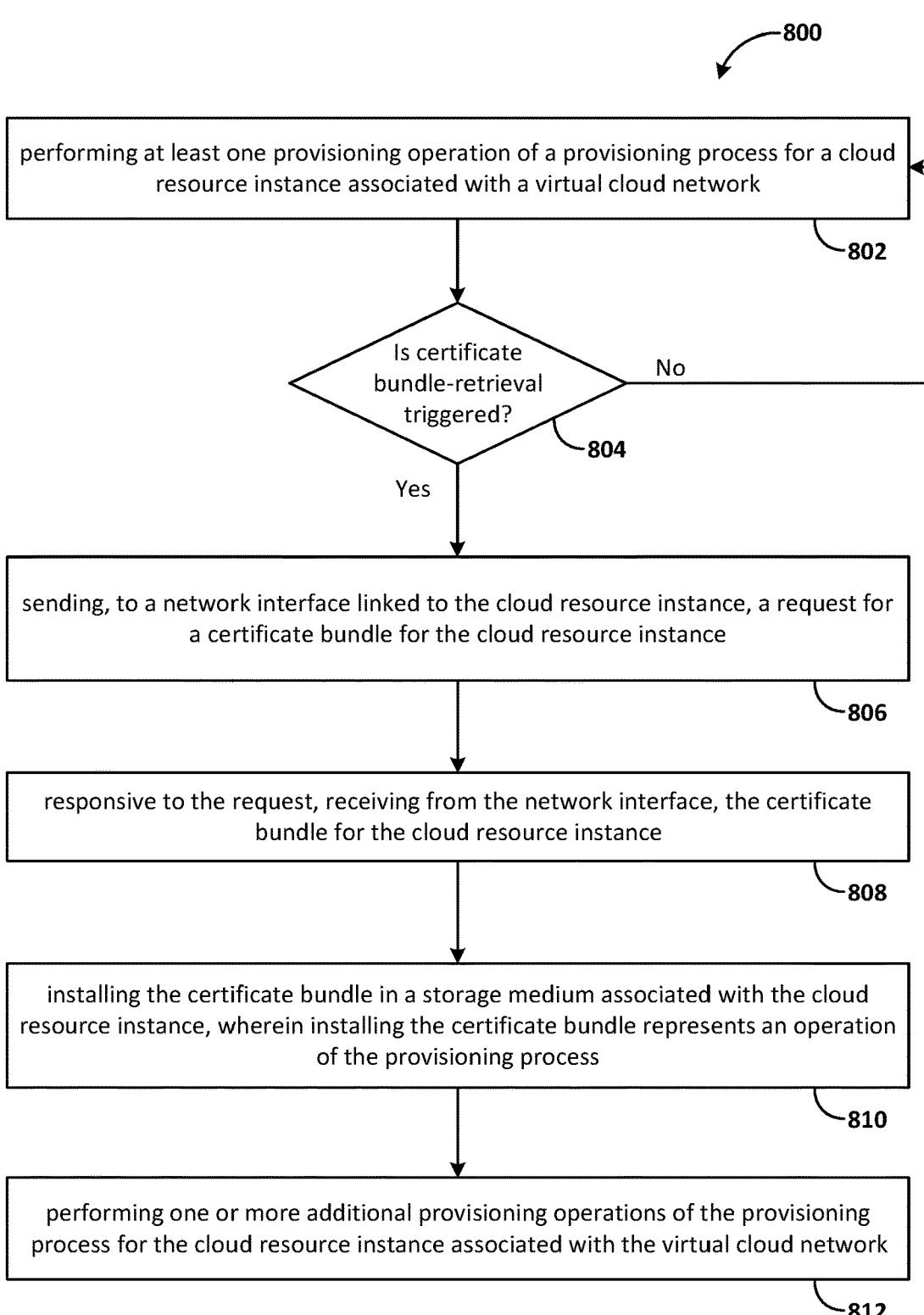

800 performing at least one provisioning operation of a provisioning process for a cloud resource instance associated with a virtual cloud network

802

Is certificate bundle-retrieval triggered?    No

804

Yes sending, to a network interface linked to the cloud resource instance, a request for a certificate bundle for the cloud resource instance

806 responsive to the request, receiving from the network interface, the certificate bundle for the cloud resource instance

808 installing the certificate bundle in a storage medium associated with the cloud resource instance, wherein installing the certificate bundle represents an operation of the provisioning process

810 performing one or more additional provisioning operations of the provisioning process for the cloud resource instance associated with the virtual cloud network

PROVISIONING CLOUD RESOURCE INSTANCES ASSOCIATED WITH A VIRTUAL CLOUD NETWORK

TECHNICAL FIELD

The present disclosure relates to virtual cloud networks. In particular, the present disclosure relates to provisioning cloud resource instances with digital certificates for authenticating network entities associated with a virtual cloud network.

BACKGROUND

A virtual cloud network includes cloud resource instances that communicate with one another. Communications between cloud resource instances may be performed in accordance with a security protocol whereby cloud resource instances authenticate one another by presenting a digital certificate. A digital certificate may be issued to a cloud resource instances by a certificate authority (CA). The digital certificate may include a digital signature of the CA that can be validated by other cloud resource instances using a public key of the CA that is made available to other cloud resource instances. When a cloud resource instances presents a valid digital certificate to another cloud resource instance, the other cloud resource instance can trust that it is communicating with the cloud resource instance, as opposed to some unknown entity, based on a trust relationship with the CA that issued the digital certificate.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 is a flowchart that illustrates example operations pertaining to provisioning a cloud resource instance associated with a virtual cloud network in accordance with one or more embodiments and FIG. 8 is a flowchart that illustrates further example operations pertaining to provisioning a cloud resource instance associated with a virtual cloud network in accordance with one or more embodiments.

DETAILED DESCRIPTION

Figure 1:
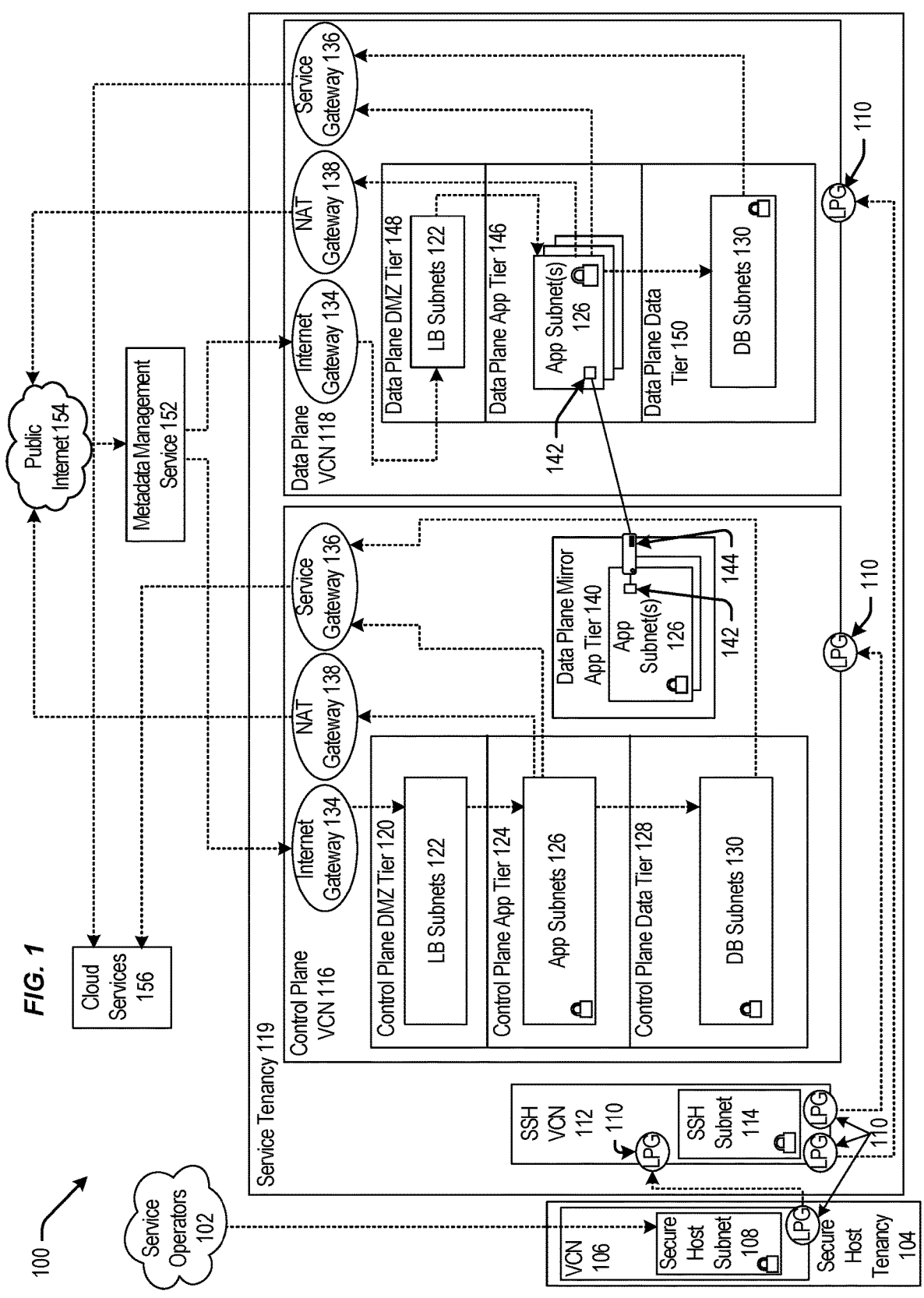
FIGS. 1-4 are block diagrams illustrating patterns for implementing a cloud infrastructure as a service system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
    2. CLOUD COMPUTING TECHNOLOGY
    3. COMPUTER SYSTEM
    4. ARCHITECTURAL OVERVIEW
    5. AUTHENTICATING NETWORK ENTITIES
    6. PROVISIONING CLOUD RESOURCE INSTANCES
    7. RETRIEVING AND INSTALLING CERTIFICATE BUNDLES
    8. MISCELLANEOUS; EXTENSIONS

1. GENERAL OVERVIEW

One or more embodiments perform a provisioning process for a cloud resource instance that includes retrieving and installing a certificate bundle responsive to detecting a certificate bundle-retrieval trigger during the provisioning process. The certificate bundle includes a set of CA certificates that facilitate subsequent operations of the provisioning process that rely on at least one of the CA certificates in the certificate bundle to establish secure communications with another network entity associated with the virtual cloud environment. The certificate bundle may be obtained by sending a request for the certificate bundle to an agent executing on a network interface in response to a certificate bundle-retrieval trigger incorporated into the provisioning process ahead of the one or more subsequent operations that will utilize at least one CA certificate in the certificate bundle. In response to the request, the agent executing on the network interface sends the certificate bundle to a provisioning module that is performing the provisioning process. The provisioning module may validate the certificate bundle by performing a signature key identifier check for at least a subset of the CA certificates, and once validated, the certificate bundle may be installed in a storage medium associated with the cloud resource instances. Upon having been installed in the storage medium, the one or more subsequent operations of the provisioning process may be performed that utilize at least one CA certificate in the certificate bundle.

Technology associated with virtual cloud networks is improved by distributing a certificate bundle to a cloud resource instance as part of the provisioning process for the cloud resource instance. For example, security of the virtual cloud network is improved by providing the certificate bundle prior to completing the provisioning process. As a result, operations of the provisioning process that involve communications with other network entities may be performed in accordance with a security protocol that utilizes at least one CA certificate in the certificate bundle. Additionally, by providing the certificate bundle during the provisioning process, such as just prior to the operations that rely on at least one CA certificate in the certificate bundle, any updates to the CA certificates in the certificate bundle may be incorporated into the provisioning process, thereby ensuring that provisioning delays or downtime are avoided that might otherwise result from an outdated CA certificate.

Further, establishing the certificate bundle during the provisioning process is more expedient than incorporating CA certificates into an OS image, utilizes fewer computing resources than generating an OS image, and avoids downtime associated with deploying the OS image. In one example, when provisioning a region of a virtual cloud network, CA certificates may be updated multiple times during the provisioning process, for example, in accordance with security protocols that call for updating CA certificates.

Consequently, with these security protocols, it may be impractical to incorporate CA certificates into OS images and sequentially generate updated OS images with each CA certificate update. For example, the time that would be consumed by generating updated OS images for each updated set of CA certificates may exceed the time constraints for provisioning the virtual cloud network. Accordingly, by providing the certificate bundle during the provisioning process as described herein, the new CA certificates are distributed more expediently while also ensuring that there is zero downtime.

One or more embodiments described in this Specification and/or recited in the claims may not be included in this General Overview section.

2. CLOUD COMPUTING TECHNOLOGY

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not be, a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure on which the code will be deployed must first be set up. In some instances, the provisioning can be done manually, a provisioning tool may be utilized to provision the resources, and/or deployment tools may be utilized to deploy the code once infrastructure is provisioned.

FIG. 1 is a block diagram illustrating an example pattern of an IaaS architecture 100, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
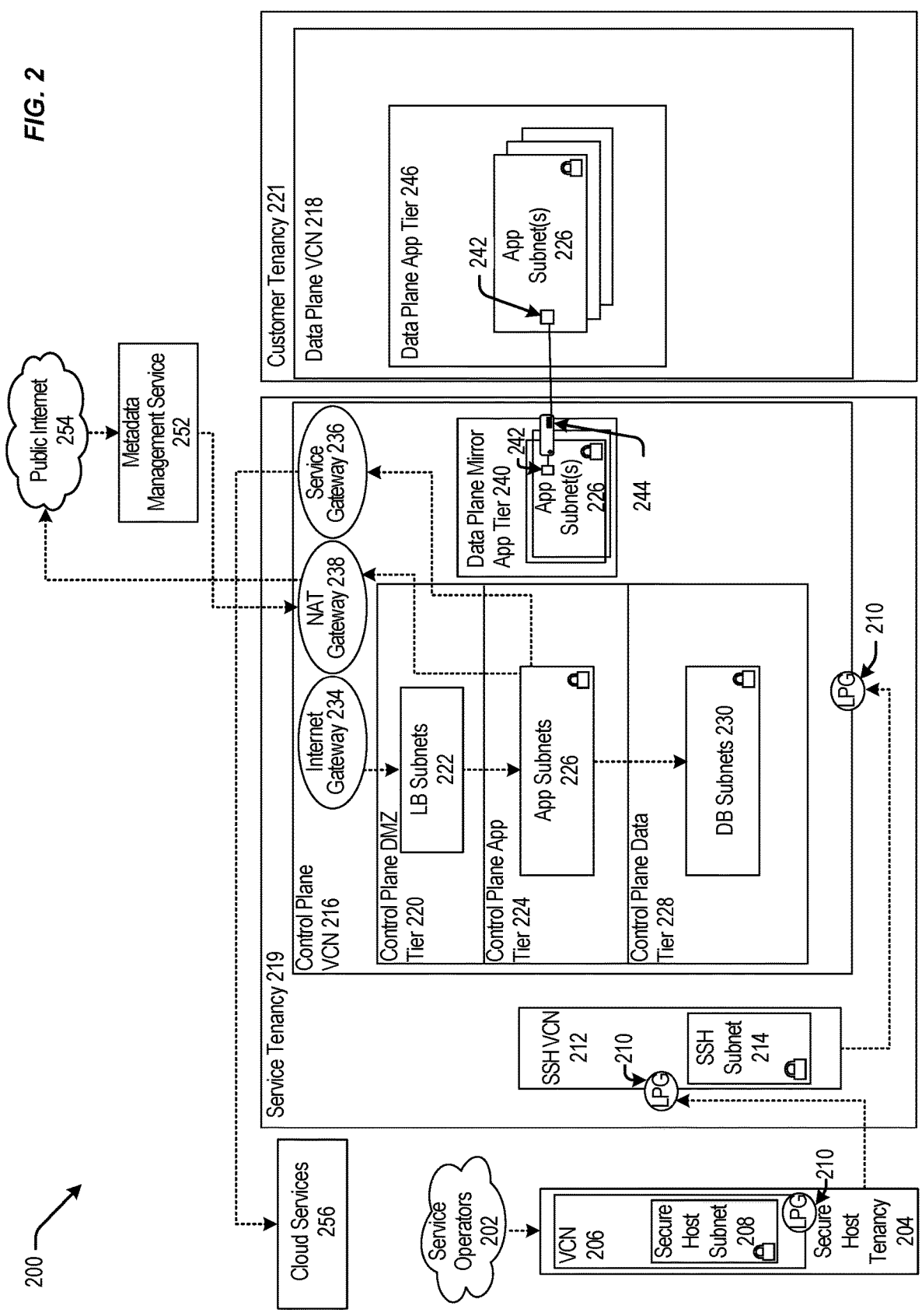

FIG. 2 is a block diagram illustrating another example pattern of an IaaS architecture 200, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
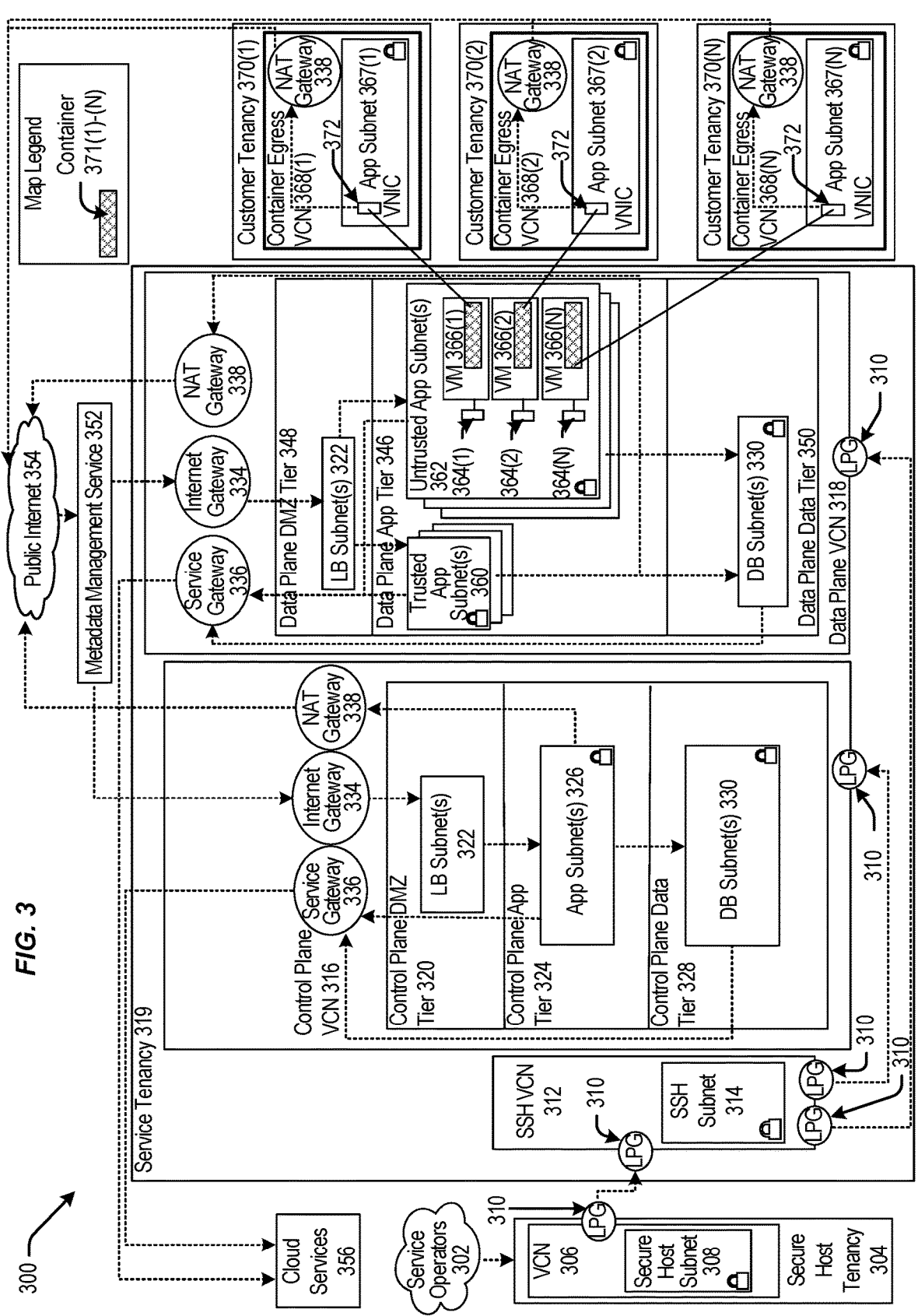

FIG. 3 is a block diagram illustrating another example pattern of an IaaS architecture 300, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code, where the containers 381(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
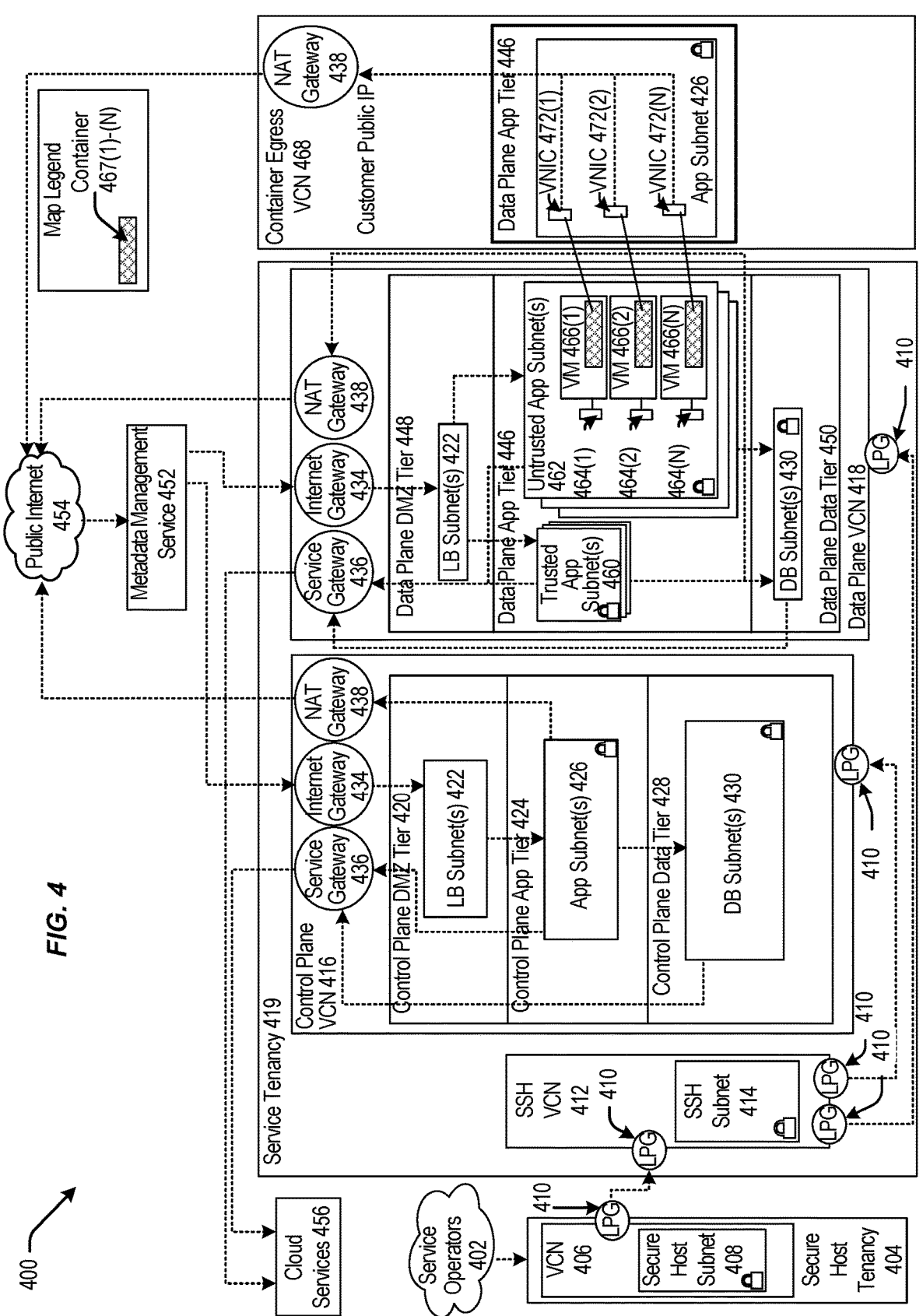

FIG. 4 is a block diagram illustrating another example pattern of an IaaS architecture 400, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467 (1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. COMPUTER SYSTEM

Figure 5:
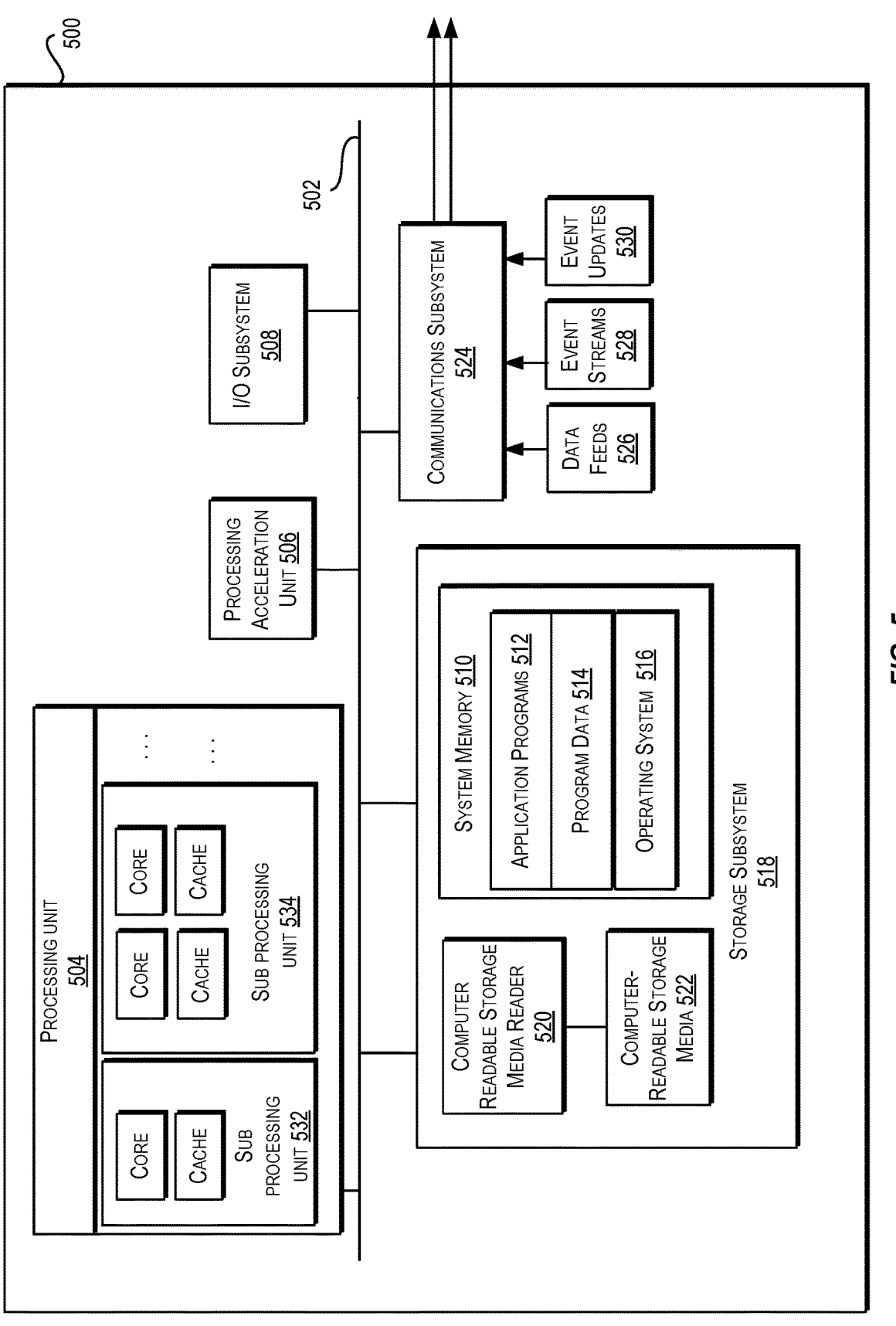
FIG. 5 is a hardware system in accordance with one or more embodiments.

FIG. 5 illustrates an example computer system 500, in which various embodiments may be implemented. The system 500 may be used to implement any of the computer systems described above. As shown in FIG. 5, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, processing unit 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD)

cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. ARCHITECTURAL OVERVIEW

Figure 6:
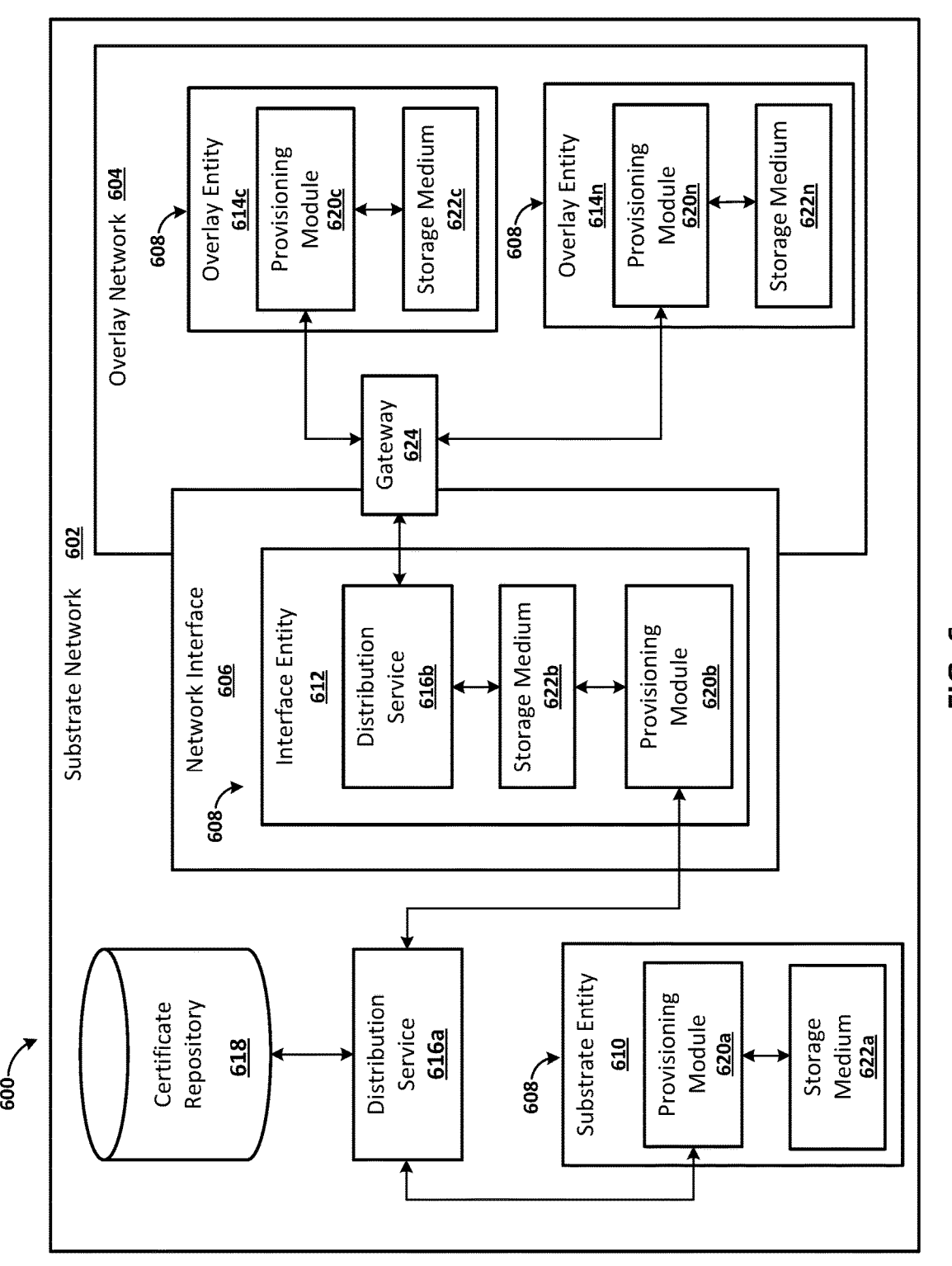
FIG. 6 illustrates an example virtual cloud network in accordance with one or more embodiments.

FIG. 6 illustrates one example of a system 600 that includes a virtual cloud network in accordance with one or more embodiments. The system 600 described with reference to FIG. 6 may perform operations associated with provisioning a cloud resource instance associated with the virtual cloud network. As illustrated in FIG. 6, the system 600 may include a substrate network 602, and overlay network 604, and a network interface 606 that provides communication between the substrate network 602 and the overlay network 604. A cloud resource instance may reside on the substrate network 602, the overlay network 604, or the network interface 606. The system may include a plurality of network entities 608 located throughout the virtual cloud network. A cloud resource instance may include a network entity 608 implemented in hardware and/or software in association with the virtual cloud network, such as a node, a host, an agent, a service, a component, an endpoint, or other element. A plurality of cloud resource instances may be provisioned throughout the virtual cloud network and may exist within the substrate network 602, the overlay network 604, or the network interface 606. The plurality of cloud resource instances, such as the plurality of network entities 608, may include one or more substrate entities 610, one or more interface entities 612, and/or one or more overlay entities 614.

As used herein, the term "substrate entity" refers to a network entity 608 implemented in a substrate network 602. As used herein, the term "substrate network" refers to a physical network infrastructure. The substrate network generally provides a foundation of a virtual cloud network. The substrate network 602 may include physical network devices, such as routers, switches, network links, and other networking components. The substrate network 602 may generally provide the basic connectivity and transport capabilities necessary for data transmission within and between data centers.

The one or more substate entities 610 may include substrate hosts, routers, firewall appliances, load balancers, storage devices, and/or substrate services. A substrate host may include an endpoint within the substrate network 602, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity 610 may include a combination of hardware and software. In one example, the one or more substrate entities 610 may include one or more substrate hosts, and/or one or more substrate services. In one example, a substrate host may include a bare metal host. In one example, a substrate service may include a firmware service. The substrate entities 610 may communicate with one another, and/or with other network entities 608, using logical network addresses assigned within the overlay network.

As used herein, the term "network interface" refers to a communication interface between a substrate network and an overlay network, such as a network interface card, a smartNIC, or the like. A network interface 606 may include one or more interface entities 612, such as a node on the network interface 606, or an interface service executing or executable on the network interface 606. A node on the network interface 606 may include a programmable hardware component, a memory component, or a gateway component. In one example, a network interface 606 may include a network interface card, such as a smartNIC. Additionally, or in the alternative, a network interface 606 may include a node or an endpoint on a network interface card or smartNIC.

A gateway component may provide connectivity between the substrate network 602 and the network interface 606, and/or between the network interface 606 and the overlay network 604. For example, a gateway component may enable communication between overlay entities 614 and substrate entities 610. Additionally, or in the alternative, a gateway component may provide connectivity between the overlay network 604 and external networks, such as the internet or other networks outside the overlay network. For example, an overlay gateway may enable communication between overlay entities 614 and external endpoints.

As used herein, the term "overlay network" refers to a virtual network built on a substrate network using software-defined networking (SDN), virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a network entity 608 implemented on an overlay network 604. The overlay network 604 may include a plurality of overlay entities 614. The plurality of overlay entities 614 may include overlay hosts, overlay services, subnets, overlay controllers, and/or overlay clients. In one example, the overlay network 604 may include a plurality of overlay entities 614, such as overlay entity 614c and overlay entity 614n. In one example, an overlay entity 614 may include an overlay host. Additionally, or in the alternative, an overlay entity 614 may include an overlay service. The plurality of overlay entities 614 may communicate with one another using logical network addresses assigned within the overlay network 604.

An overlay host may include an endpoint within the overlay network 604, such as a virtual machine, a container, or a physical server. An overlay service may include a service executing or executable on an overlay entity. An overlay service may include a client-specific service, such as a service installed by a client. Additionally, or in the alternative, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interact with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts, acting as consumers or clients of those resources or services.

Referring further to FIG. 6, the system 600 may include at least one distribution service 616 and at least one certificate repository 618. A distribution service 616 may be configured to distribute certificate bundles that include CA certificates to at least some of the network entities 608. The certificate bundles may be housed in a certificate repository 618 accessible by the distribution service 616. The distribution service 616 may retrieve a certificate bundle from the certificate repository 618 and send the certificate bundle to one or more of the network entities 608.

The certificate repository 618 may include a storage medium on the substrate network 602 or other physical hardware associated with the virtual cloud network. The certificate repository 618 may include any type of storage unit and/or device (e.g., a file system, database, collection of tables, or any other storage mechanism) for storing data. Further, the certificate repository 618 may include multiple different storage units and/or devices. The multiple different storage units and/or devices may or may not be of the same type or located at the same physical site. Further, the certificate repository 618 may be implemented or executed on the same computing system as a distribution service 616 and/or the network entities 608. Additionally, or in the alternative, a certificate repository 618 may be implemented or executed on a computing system separate from a distribution service 616 and/or the network entities 608. The certificate repository 618 may be communicatively coupled to a distribution service 616 via a direct connection or via a network.

In one example, a first distribution service 616a may be implemented on the substrate network 602. A distribution service 616 implemented on the substrate network 602 may be communicatively coupled with one or more substrate entities 610 on the substrate network 602. Additionally, or in the alternative, a distribution service 616 implemented on the substrate network 602 may be communicatively coupled with the network interface 606, such as with one or more interface entities 612 on the network interface 606. For example, the first distribution service 616a may obtain certificate bundles from the certificate repository 618 and distribute the certificate bundles to one or more substrate entities 610 on the substrate network 602 and/or to one or more interface entities 612 on the network interface 606.

In one example, a second distribution service 616b may be implemented on the network interface 606. A distribution service 616 implemented on the network interface 606 may be communicatively coupled with the overlay network 604 and/or the substrate network 602. For example, the second distribution service 616b implemented on the network interface 606 may be communicatively coupled with one or more overlay entities 614 on the overlay network 604. The second distribution service 616b may distribute certificate bundles to one or more overlay entities 614 on the overlay network 604. In one example, the second distribution service 616b may obtain certificate bundles from a storage medium associated with the network interface 606, such as from a storage medium associated with an interface entity 612 on the network interface 606. For example, the second distribution service 616b may distribute a certificate bundle that has been installed in the storage medium associated with the network interface 606 and/or the interface entity 612. In one example, the first distribution service 616a may distribute a certificate bundle to an interface entity 612 on the network interface 606, and the second distribution service 616b may distribute the certificate bundle to one or more overlay entities 614 on the overlay network 604 after the certificate bundle has been installed in the storage medium associated with the interface entity 612.

As shown in FIG. 6, each network entity 608 may include a provisioning module 620 and a storage medium 622. The provisioning module 620 may perform an initial provisioning of the network entity 608. Additionally, or in the alternative, the provisioning module 620 may perform periodic updates to the network entity 608. An initial provisioning and/or a periodic update of a network entity 608 may include obtaining a certificate bundle and installing the certificate bundle in the storage medium 622 associated with the network entity 608. The provisioning module 620 may request a certificate bundle from a distribution service 616. The request for a certificate bundle may be associated with an initial provisioning of the network entity 608 or a periodic update to the network entity 608. The distribution service 616 may distribute a certificate bundle to the provisioning module 620 responsive to a request from the provisioning module 620. Additionally, or in the alternative, the distribution service may push certificate bundles to a provisioning module 620, for example, without receiving a request from the provisioning module 620.

A provisioning module 620 of an overlay entity 614 may send requests for a certificate bundle to a distribution service 616 by way of a gateway 624 between the network interface 606 and the overlay entities 614. Additionally, or in the alternative, the distribution service 616 may send the certificate bundles to the overlay entities 614 by way of the gateway 624, for example, in response to a request from a provisioning module 620. In one example, the gateway 624 may be a metadata interface configured for exchanging metadata between the network interface 606 and the overlay entities 614. In one example, the gateway 624 may be utilized between the network interface 606 and each of the overlay entities 614. Additionally, or in the alternative, the network interface 606 may include a set of gateways 624, with each gateway 624 corresponding to a respective overlay entity 614.

A distribution service 616 may distribute certificate bundles to network entities 608 associated with a particular region or to network entities 608 of a plurality of different regions within a realm. Additionally, or in the alternative, a distribution service 616 may distribute certificate bundles to network entities 608 associated with a particular virtual cloud network, or to network entities 608 of a plurality of different virtual cloud networks. Additionally, or in the alternative, a distribution service 616 may distribute certificate bundles to network entities 608 associated with a particular overlay network 604, or to network entities 608 of a plurality of different overlay networks 604. In one example, the system 600 may include a plurality of regions associated with a realm. In one example, the system 600 may include a plurality of realms that respectively include a plurality of regions. As used herein, the term "region" refers to a set of one or more interconnected data centers upon which a virtual cloud network is deployed. In one example, a region may correspond to a physical geographic area. In one example, a region may correspond to multiple physical geographic areas and/or a portion of a physical geographic area. As used herein, the term "realm" refers to a distinct deployment of an IaaS system infrastructure. In one example, regions within a realm may communicate with one another. In one example, regions from different realms may be unable to communicate with one another.

In one or more embodiments, the system 600 may include more or fewer components than the components illustrated in FIG. 6. The components illustrated in FIG. 6 may be local to or remote from each other. The components illustrated in FIG. 6 may include software and/or hardware components. Each component may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

5. AUTHENTICATING NETWORK ENTITIES

Network entities may utilize the CA certificates in a certificate bundle to authenticate other network entities associated with the virtual cloud network. For example, communications between network entities may be conducted according to a security protocol. The security protocol may include authenticating a network entity based on an entity certificate issued to the network entity by a CA, for example, prior to establishing communications with the network entity.

In one example, the entity certificate and a CA certificate corresponding to the CA that issued the entity certificate may represent at least a portion of a certificate chain. To authenticate the network entity, each signature-key pair in the certificate chain is validated. In one example, a top-level CA may issue the entity certificate, in which case the certificate chain may include one signature-key pair—that is, the digital signature of the top-level CA in the entity certificate, and the public key of the top-level CA. Such a top-level CA is sometimes referred to as a root CA. In another example, the certificate chain may include signature-key pairs corresponding to multiple CA certificates. For example, a root CA may issue an intermediate CA certificate to an intermediate CA, and the intermediate CA may issue the entity certificate to the network entity. In this case, the certificate chain includes two signature-key pairs—that is, (i) the digital signature of the intermediate CA in the entity certificate, and the public key of the intermediate CA; and (ii) the digital signature of the root CA in the intermediate CA certificate, and the public key of the root CA.

As used herein, the term "certificate authority certificate" or "CA certificate" refers to a digital certificate issued by a CA to establish its own identity and authenticity. A certificate authority certificate may be a root CA certificate or an intermediate CA certificate. A certificate authority certificate may be used to sign and issue other digital certificates, including those used for secure communication between network entities.

As used herein, the term "certificate authority" or "CA" refers to an entity responsible for issuing and managing digital certificates. The CA verifies the identity of network entities and digitally signs their certificates to attest to their authenticity.

As used herein, the term "root certificate authority certificate" or "root CA certificate" refers to a top-level CA certificate in a certificate chain or hierarchy. A root CA certificate may be self-issued and/or self-signed by a root CA. As used herein, the term "root CA" refers to a top-level CA in a CA hierarchy. A root CA may issue root CA certificates, intermediate CA certificates, or entity certificates.

As used herein, the term "intermediate certificate authority certificate" or "intermediate CA certificate" refers to an intermediate-level CA certificate in a certificate chain or hierarchy. An intermediate CA certificate may be issued by a root CA. An intermediate CA certificate is located between a root CA certificate and an entity certificate in a certificate chain or hierarchy. As used herein, the term "intermediate CA" refers to an intermediate-level CA in a CA hierarchy. An intermediate CA may issue entity certificates, for example, pursuant to authority granted to an intermediate CA according to a root CA.

As used herein, the term "entity certificate" refers to a digital certificate issued to an entity, such as a network entity associated with a virtual cloud network. An entity certificate may be used to verify the identity of the entity and enable secure communication between entities, such as between network entities in a virtual cloud network. An entity certificate may be issued by a CA, such as root CA or an intermediate CA.

In one example, an entity certificate may be an instance principal certificate. As used herein, the term "instance principal certificate" refers to a digital certificate used to authenticate and secure communication for an instance or VM associated with a virtual cloud network. In one example, instances and VMs may be created, scaled, and terminated dynamically. Instance principal certificates may be associated with an instance or VAM during its lifecycle and may be automatically generated and managed by the virtual cloud network infrastructure. An instance principal certificate may have limited access to communicate with certain network entities based on permissions assigned to the network entity to which the instance principal certificate is issued.

As used herein, the term "digital certificate" refers to a digitally signed electronic document that binds a public key to the identity of an entity. A digital certificate may conform to International Telecommunication Union standard X.509. A digital certificate may include an issuer's name, a certificate holder's name, a public key, issuer (CA) information, and expiration date. Digital certificates may be used in various security protocols, such as SSL/TLS, to establish the identity and authenticity of the communicating parties and facilitate secure communication.

6. PROVISIONING CLOUD RESOURCE INSTANCES

Figure 7:
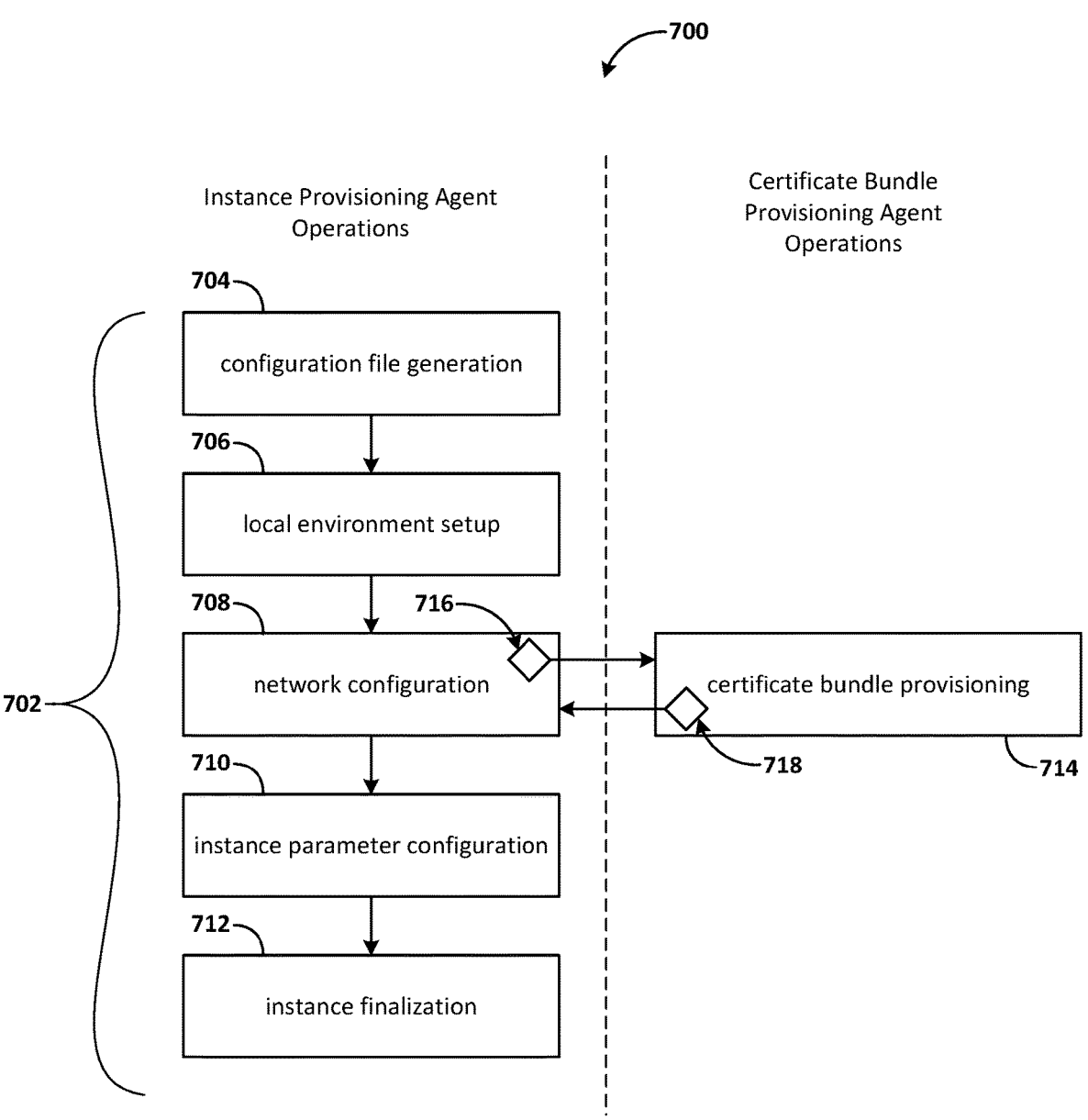

Referring now to FIG. 7, an example operations for provisioning a cloud resource instance associated with a virtual cloud network are further described. Provisioning a cloud resource instance may include creating and configuring the cloud resource instance for use on the virtual cloud network. Upon having been provisioned, the cloud resource instance may be made available for use on the virtual cloud network. Following provisioning, various deployment operations may be performed, for example, by a customer or tenant of the cloud resource instance. As shown in FIG. 7, a provisioning process 700 may include a plurality of phases 702. Each of the phases 702 may include one or more operations for provisioning the cloud resource instance. The phases 702, and/or the operations associated with a respective phase 702, of the provisioning process 700 may be modified, rearranged, or omitted all together. Accordingly, the particular sequence of the phases 702 and/or associated operations described with reference to FIG. 7 should not be construed as limiting the scope of one or more embodiments.

As shown in FIG. 7, the provisioning process 700 may include at least one of: a configuration file generation phase 704, a local environment setup phase 706, a network configuration phase 708, an instance parameter configuration phase 710, or an instance finalization phase 712. Additionally, or in the alternative, the provisioning process 700 may include a certificate bundle provisioning phase 714.

In one example, the configuration file generation phase 704 may include one or more operations associated with identifying data sources available to the provisioning module and/or the instance provision agent, and generating configuration files accordingly. The available data sources may include a distribution service, a certificate repository, and/or a storage medium associated with a network entity. Additionally, or in the alternative, the available data sources may include metadata sources, such as cloud provider metadata services and/or instance-specific metadata services.

In one example, the local environment setup phase 706 may include one or more operations associated with setting up the local environment of the cloud resource instance. For example, the local environment phase may include hostname configuration, setting up user accounts, and executing scripts or commands specified in data sources referenced in connection with the provisioning process 700.

In one example, the network configuration phase 708 may include one or more operations associated with configuring network interfaces and related settings, such as assigning IP addresses, configuring DNS settings, defining routes, and managing network bonding or bridging configurations. Additionally, or in the alternative, the network configuration phase 708 may include configuring security protocol settings, including creating certificate bundle file directories, generating pointers to the certificate bundle filed directories, and/or acquiring a network entity certificate(s) for the cloud resource instance.

In one example, the instance parameter configuration phase 710 may include one or more operations associated with processing configuration files generated in the configuration file generation phase 704 and/or one or more operations associated with applying specified settings to the cloud resource instance. The specified settings may include package installation settings, user-specific settings, file modification settings, and/or service configuration settings.

In one example, the instance finalization phase 712 may include one or more operations associated with additional instance configuration scripts and/or system cleanup tasks.

In one example, the certificate bundle provisioning phase 714 may include one or more operations associated with retrieving, validating, and installing a certificate bundle that includes a set of CA certificates. For example, the certificate bundle provisioning phase 714 may include one or more operations described with reference to FIG. 8.

In one example, at least a portion of the provisioning process 700 may be performed by a provisioning module associated with the cloud resource instance. Additionally, or in the alternative, a portion of the provisioning process 700 may be performed by one or more provisioning agents. The one or more provision agents may represent a portion of the provisioning module. Additionally, or in the alternative, a provisioning agent may represent a service executing on the virtual cloud network. The provisioning module may call the one or more provisioning agents and prompt the one or more provisioning agents to perform at least a portion of the provisioning process.

In one example, as shown, the provisioning process may include one or more operations performed by an instance provisioning agent and one or more operations performed by a certificate bundle provisioning agent. The instance provisioning agent and/or the certificate bundle provisioning agent may represent a portion of the provisioning module or a service executing on the virtual cloud network. In one example, the instance provisioning agent may perform at least one of: the configuration file generation phase 704, the local environment setup phase 706, the network configuration phase 708, the instance parameter configuration phase 710, or the instance finalization phase 712. The certificate bundle provisioning agent may perform one or more operations associated with the certificate bundle provisioning phase 714.

In one example, the certificate bundle provisioning phase 714 may be triggered by a certificate bundle-retrieval trigger 716 within the provisioning process 700. The certificate bundle-retrieval trigger 716 may be an executable command associated with one or more operations of the provisioning process 700. For example, as shown, the certificate bundle-retrieval trigger may be associated with the network configuration phase 708. Responsive to detecting the certificate bundle-retrieval trigger 716, the instance provisioning agent may prompt the certificate bundle provisioning agent to perform one or more operations associated with the certificate bundle provisioning phase 714. After having completed the one or more operations associated with the certificate bundle provisioning phase 714, the certificate bundle provisioning agent may prompt the instance provisioning agent that the one or more operations associated with the certificate bundle provisioning phase 714. For example, the certificate bundle provisioning phase 714 may include a certificate bundle-installed trigger 718. Responsive to detecting the certificate bundle-installed trigger 718, the certificate bundle provisioning agent may send a notification to the instance provisioning agent to prompt the instance provisioning agent that the one or more operations associated with the certificate bundle provisioning phase 714 are complete. Responsive to receiving the prompt from the certificate bundle provisioning agent, the instance provisioning agent may perform one or more subsequent operations of the provisioning process 700.

One or more phases of the provisioning process 700 may be performed prior to detecting the certificate bundle-retrieval trigger 716. For example, the configuration file generation phase 704 and the local environment setup phase 706 may be performed prior to detecting the certificate bundle-retrieval trigger 716. Additionally, or in the alternative, at least a portion of the network configuration phase may be performed prior to detecting the certificate bundle-retrieval trigger 716. One or more phases of the provisioning process 700 may be performed after the certificate bundle-installed trigger 718, such as after the certificate bundle provisioning phase 714 is complete. For example, the instance parameter configuration phase 710 and the instance finalization phase 712 may be performed after the certificate bundle-installed trigger 718. Additionally, or in the alternative, at least a portion of the network configuration phase 708 may be performed after the certificate bundle-installed trigger 718.

In one example, the provisioning process 700 may include initializing a security protocol for secure communication between a cloud resource instance and another network entity associated with the virtual cloud network. The security protocol may be initialized as part of the network configuration phase 708. For example, the security protocol may be initialized to allow performance of further operations associated with the network configuration phase 708 and/or one or more other phases of the provisioning process 700.

In one example, initializing the security protocol may include receiving an entity certificate from a network entity, authenticating the entity certificate using at least one CA certificate of the certificate bundle. In one example, after having initialized the security protocol, one or more subsequent operations of the provisioning process 700 may be performed, such as one or more operations of the network configuration phase 708, the instance parameter configuration phase 710, and/or the instance finalization phase 712. In one example, the one or more subsequent operations of the provisioning process 700 may include, upon having initialized the security protocol, receiving a first secure communication from the network entity in accordance with the security protocol, or sending a second secure communication to the network entity in accordance with the security protocol.

In one example, the cloud resource instance may lack access to at least one CA certificate prior to detecting the certificate bundle-retrieval trigger 716 and/or prior to completion of the certificate bundle provisioning phase 714. The cloud resource instance may gain access to the CA certificates upon completion of the certificate bundle provisioning phase 714. In one example, the one or more subsequent operations of the provisioning process 700 performed after the certificate bundle provisioning phase 714 may include one or more operations that utilize the secure communication established between the cloud resource instance and the network entity according to the security protocol.

In one example, the at least one subsequent operation of the provisioning process 700 may include sending, to a service agent executing on the cloud resource instance, a notification that includes a location of the certificate bundle in the storage medium. Additionally, or in the alternative, the certificate bundle may be sent to the service agent. The service agent may include, or may be associated with, an overlay service, a substrate service, or an interface service. The service agent may perform one or more provisioning operations associated with provisioning an overlay service, a substrate service, or an interface service. For example, the service agent may perform, with respect to the overlay service, a substrate service, or an interface service, one or more operations associated with the provisioning process 700 described herein.

7. RETRIEVING AND INSTALLING CERTIFICATE BUNDLES

Referring now to FIG. 8, operations 800 pertaining to provisioning network entities associated with a virtual cloud network are further described. One or more operations 800 described with reference to in FIG. 8 may be modified, rearranged, or omitted all together. Accordingly, the particular sequence of operations 800 described with reference to FIG. 8 should not be construed as limiting the scope of one or more embodiments.

In one example, the operations 800 described with reference to FIG. 8 may represent a portion of a provisioning process for provisioning a cloud resource instance associated with a virtual cloud network. For example, the operations 800 described with reference to FIG. 8 may include operations associated with a certificate bundle provisioning phase of the provisioning process.

As shown in FIG. 8, the operations 800 may include, at block 802, performing at least one provisioning operation of a provisioning process for a cloud resource instance associated with a virtual cloud network. In one example, the at least one provisioning operation may include at least one operation associated with a configuration file generation phase and/or at least one operation associated with a local environment setup phase, for example, as described with reference to FIG. 7. Additionally, or in the alternative, the at least one provisioning operation may include at least one operation associated with a network configuration phase, for example, as described with reference to FIG. 7.

During the provisioning process, a certificate bundle retrieval may be triggered. At block 804, the operations 800 may include detecting whether the certificate bundle-retrieval is triggered. The certificate bundle-retrieval trigger may be an executable command associated with one or more operations of the provisioning process, for example, as described with reference to FIG. 7. The executable command may be incorporated into computer-executable instructions executed, for example, by an instance provisioning agent. In one example, the instance provisioning agent may detect that the certificate bundle-retrieval is triggered, for example, based on the executable command in the computer-executable instructions. Responsive to detecting the certificate bundle-retrieval trigger, the instance provisioning agent may prompt a certificate bundle provisioning agent to perform one or more operations associated with the certificate bundle provisioning phase, for example, as described with reference to FIG. 7. The certificate bundle provisioning agent to perform one or more operations associated with the certificate bundle provisioning phase according to executable operations executed by the certificate bundle provisioning agent.

If the certificate bundle-retrieval is not triggered, the operations 800 may return to block 802, and an additional operation of the provisioning process may be performed. When the certificate bundle-retrieval is triggered, the operations 800 may proceed to block 806.

At block 806, the operations may include sending, to a network interface linked to the cloud resource instance, a request for a certificate bundle for the cloud resource instance. For example, the request for the certificate bundle may be sent to a distribution service executing on the network interface. The request for the certificate bundle for the cloud resource instance may be sent by the certificate bundle provisioning agent, for example, as described with reference to FIG. 7. The location of the network interface and/or the distribution service may be determined from a network directory address associated with the network interface and/or the distribution service executing on the network interface. The network directory address may be incorporated into computer-executable instructions executed, for example, by the certificate bundle provisioning agent. The request for the certificate bundle may include configuration information about the cloud resource instance. The network interface may select the certificate bundle based on the configuration information. The request for the certificate bundle may include a network location for the network interface to send the certificate bundle, such as a network directory address of the cloud resource instance and/or a file directory associated with the cloud resource instance where the certificate bundle may be installed.

Responsive to receiving the request, the operations may include, at block 808, receiving from the network interface, the certificate bundle for the cloud resource instance. The certificate bundle may include a set of CA certificates. The set of CA certificates may include one or more root CA certificates and/or one or more intermediate CA certificates.

At block 810, the operations 800 may include installing the certificate bundle in a storage medium associated with the cloud resource instance. Installing the certificate bundle may include making the certificate bundle available for the cloud resource instance to use in validating network entities. For example, installing the certificate bundle may include creating a file and storing the certificate bundle in the file. Additionally, or in the alternative, installing the certificate bundle may include creating a file directory for the certificate bundle and/or specifying a location where processes or applications that may run on the cloud resource instance can find the certificate bundle. For example, the location of the certificate bundle may be specified in an operating system configuration file, in a registry settings file, or in an executable file. Installing the certificate bundle may represent an operation of the provisioning process. In one example, prior to installing the certificate bundle, the operations 800 may include one or more validation operations with respect to the certificate bundle. In one example, the operations 800 may include performing a validation of the certificate bundle, determining that the certificate bundle passes the validation, and installing the certificate bundle in the storage medium responsive to determining that the certificate bundle passes the validation.

In one example, the validation of the certificate bundle may include executing a subject key identifier check for at least a subset of CA certificates from among the set of CA certificates in the certificate bundle. The validation operation may include determining that each CA certificate of the subset of CA certificates passes the subject key identifier check. In one example, the subject key identifier check may be performed for all of the CA certificates in the certificate bundle. For a particular CA certificate, the subject key identifier check may include: computing a hash value of a public key corresponding to the particular CA certificate, determining a subject key identifier corresponding to the particular CA certificate, and comparing the hash value to the subject key identifier. The subject key identifier may be a digital signature on the CA certificate. The subject key identifier may correspond to a private key associated with the public key. The private key and the public key may represent an asymmetric key pair. For example, the subject key identifier, such as the digital signature on the CA certificate, may have been generated using the private key. The subject key identifier may be decrypted using a hash function.

In one example, the subject key identifier check may further include determining a match between the hash value and the subject key identifier corresponding to the particular CA certificate. The particular CA certificate may be determined to pass the subject key identifier check when there is a match between the hash value and the subject key identifier. In one example, the match between the hash value and the subject key identifier may be determined by decrypting the subject key identifier using a hash function, and comparing the resulting decryption to the hash value of the public key. When the public key matches the subject key identifier, the decryption of the subject key identifier matches the hash value of the public key. The validation may include determining, based on the match, that the particular CA certificate passes the subject key identifier check.

In one example, the operations 800 may include determining that the certificate bundle fails the validation, and generating an alert for display on a user interface device indicating that the certificate bundle failed the validation. Additionally, or in the alternative, responsive to determining that the certificate bundle having failed the validation, the operations 800 may include sending, to the network interface (and/or to a distribution service executing on the network interface), a subsequent request for an updated certificate bundle for the cloud resource instance. Responsive to receiving the subsequent request at the network interface (and/or at the distribution service), the operations 800 may include the network interface sending the updated certificate bundle for the cloud resource instance. Additionally, or in the alternative, the operations 800 may include receiving from the network interface, the updated certificate bundle for the cloud resource instance. The updated certificate bundle may include an updated set of CA certificates. The operations 800 may further include performing a subsequent validation of the updated certificate bundle. For example, the subsequent validation may include a signature key identifier check as described above. Responsive to determining that the updated certificate bundle passes the subsequent validation, the operations 800 may include installing the updated certificate bundle in the storage medium.

After having installed the certificate bundle at block 810, the operations 800 may include, at block 812, further performing one or more additional provisioning operations of the provisioning process for the cloud resource instance associated with the virtual cloud network. In one example, the one or more additional provisioning operations may include at least one operation associated with the network configuration phase, for, example, as described with reference to FIG. 7. For example, the one or more additional provisioning operations may include configuring one or more network configuration settings for the cloud resource instance. The one or more network configuration settings may be configured as part of the network configuration phase. In one example, the one or more additional provisioning operations of the provisioning process may be triggered by a certificate bundle-installed trigger, as described with reference to FIG. 7. The certificate bundle-installed trigger may be an executable command incorporated into computer-executable instructions executed by the certificate bundle provisioning agent. Responsive to detecting the certificate bundle-installed trigger, the certificate bundle provisioning agent may send a notification to the instance provisioning agent to prompt the instance provisioning agent that the one or more operations associated with the certificate bundle provisioning phase are complete. Responsive to receiving the prompt from the certificate bundle provisioning agent, the instance provisioning agent may perform one or more subsequent operations of the provisioning process.

In one example, at block 812, the operations 800 may include performing a network configuration stage of the provisioning process. During or subsequent to the network configuration stage, the operations 800 may include performing at least one of: detecting the certificate bundle-retrieval trigger, receiving the certificate bundle, installing the certificate bundle in the storage medium. Additionally, or in the alternative, the operations 800 may include generating a file directory in the storage medium, installing the certificate bundle in the file directory, and/or sending, to a service agent executing on the cloud resource instance, a message including a directory path to the file directory. Additionally, or in the alternative, the one or more additional provisioning operations of the provisioning process at block 812 may include at least one operation associated with the instance parameter configuration phase, and/or at least one operation associated with the instance finalization phase, for example, as described with reference to FIG. 7. The one or more additional provisioning operations of the provisioning process may be performed, at block 812, by the instance provisioning agent, for example, according to computer-executable instructions executed by the instance provision agent.

8. MISCELLANEOUS; EXTENSIONS

Embodiments are directed to a system with one or more devices that include a hardware processor and that are configured to perform any of the operations described herein and/or recited in any of the claims below.

Embodiments are directed to a system including means to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer readable medium comprising instructions which, when executed by one or more hardware processors, causes performance of operations comprising:

detecting, during a provisioning process for a cloud resource instance associated with a virtual cloud network, a certificate bundle-retrieval trigger;

responsive to detecting the certificate bundle-retrieval trigger, sending, to an agent executing on a network interface linked to the cloud resource instance, a request for a certificate bundle for the cloud resource instance;

receiving from the agent executing on the network interface, the certificate bundle for the cloud resource instance, the certificate bundle comprising a set of one or more certificate authority (CA) certificates;

installing the certificate bundle in a storage medium associated with the cloud resource instance to facilitate establishing a secure communication for one or more operations of the provisioning process occurring subsequent to installing the certificate bundle in the storage medium;

subsequent to installing the certificate bundle in the storage medium, executing the one or more operations of the provisioning process, the one or more operations of the provisioning process relying on at least one CA certificate, of the set of one or more CA certificates, to establish the secure communication with at least one network entity associated with the virtual cloud network.

2. The medium of claim 1, wherein the certificate bundle-retrieval trigger comprises:

an executable command associated with an operation of the provisioning process.

3. The medium of claim 1, wherein the agent executing on the network interface comprises a certificate distribution service executing on the network interface, wherein responsive to receiving the request for the certificate bundle, the certificate distribution service provides the certificate bundle for installation in the storage medium associated with the cloud resource instance.

4. The medium of claim 1, wherein the set of one or more CA certificates comprise at least one of: a set of root certificates, or a set of intermediate certificates.

5. The medium of claim 1, wherein the operations further comprise:

prior to installing the certificate bundle, performing a validation of the certificate bundle;

determining that the certificate bundle passes the validation;

wherein installing the certificate bundle in the storage medium is responsive to determining that the certificate bundle passes the validation.

6. The medium of claim 5, wherein the validation comprises executing a subject key identifier check for at least a subset of CA certificates from among the set of one or more CA certificates, wherein for a first CA certificate, the subject key identifier check comprises:

computing a first hash value of a first public key corresponding to the first CA certificate, determining a first subject key identifier corresponding to the first CA certificate, comparing the first hash value to the first subject key identifier, determining a match between the first hash value and the first subject key identifier, and determining, based on the match, that the first CA certificate passes the subject key identifier check; and wherein the operations further comprise:

determining that each CA certificate of at least the subset of CA certificates passes the subject key identifier check.

7. The medium of claim 1, wherein the operations further comprise:

prior to installing the certificate bundle, performing a validation of the certificate bundle, wherein the certificate bundle fails the validation;

generating an alert for display on a user interface device, the alert indicating the certificate bundle having failed the validation.

8. The medium of claim 7, wherein the operations further comprise:

responsive to determining that the certificate bundle having failed the validation, sending, to the agent executing on the network interface, a subsequent request for an updated certificate bundle for the cloud resource instance;

receiving from the agent executing on the network interface, the updated certificate bundle for the cloud resource instance, the updated certificate bundle comprising an updated set of CA certificates;

performing a subsequent validation of the updated certificate bundle, wherein the updated certificate bundle passes the subsequent validation;

wherein installing the certificate bundle in the storage medium comprises installing the updated certificate bundle in the storage medium responsive to determining that the updated certificate bundle passes the subsequent validation.

9. The medium of claim 1, wherein the operations further comprise:

sending a notification to a provisioning module executing on the cloud resource instance, the notification indicating the certificate bundle having been installed in the storage medium;

wherein the provisioning module (a) utilizes the at least one CA certificate, of the set of one or more CA certificates, to establish the secure communication with the at least one network entity associated with the virtual cloud network, and (b) performs the one or more operations of the provisioning process utilizing the secure communication.

10. The medium of claim 1, wherein the operations further comprises:

subsequent to installing the certificate bundle in the storage medium, further performing the provisioning process;

wherein further performing the provisioning process comprises:

initializing a security protocol for the secure communication, wherein the secure communication is between the cloud resource instance and a first network entity associated with the virtual cloud network, wherein initializing the security protocol comprises:

receiving an entity certificate from the first network entity, and authenticating the entity certificate using a first CA certificate of the set of one or more CA certificates in the certificate bundle; and executing the one or more operations of the provisioning process, the one or more operations comprising:

receiving a first secure communication from the first network entity in accordance with the security protocol; or sending a second secure communication to the first network entity in accordance with the security protocol.

11. The medium of claim 1, wherein the operations further comprises:

subsequent to installing the certificate bundle in the storage medium, performing at least one subsequent provisioning operation of the provisioning process, the at least one subsequent provisioning operation comprising at least one of:

sending, to a service agent executing on the cloud resource instance, a notification comprising a location of the certificate bundle in the storage medium; or sending the certificate bundle to the service agent.

12. The medium of claim 1, wherein the operations further comprise:

performing at least one provisioning operation of the provisioning process prior to detecting the certificate bundle-retrieval trigger, wherein the at least one provisioning operation comprises:

configuring one or more network configuration settings for the cloud resource instance.

13. The medium of claim 1, wherein the operations further comprise:

prior to detecting the certificate bundle-retrieval trigger, receiving the certificate bundle at the agent executing on the network interface; and storing the certificate bundle in a network interface storage medium of the network interface.

14. The medium of claim 1, wherein the operations further comprise:

performing a network configuration stage of the provisioning process; and during or subsequent to the network configuration stage, performing at least one of:

detecting the certificate bundle-retrieval trigger;

receiving the certificate bundle; or installing the certificate bundle in the storage medium.

15. The medium of claim 1, wherein the operations further comprise:

generating a file directory in the storage medium;

installing the certificate bundle in the file directory; and sending, to a service agent executing on the cloud resource instance, a message comprising a directory path to the file directory.

16. A method, comprising:

detecting, during a provisioning process for a cloud resource instance associated with a virtual cloud network, a certificate bundle-retrieval trigger;

responsive to detecting the certificate bundle-retrieval trigger, sending, to an agent executing on a network interface linked to the cloud resource instance, a request for a certificate bundle for the cloud resource instance;

receiving from the agent executing on the network interface, the certificate bundle for the cloud resource instance, the certificate bundle comprising a set of one or more certificate authority (CA) certificates;

installing the certificate bundle in a storage medium associated with the cloud resource instance to facilitate establishing a secure communication for one or more operations of the provisioning process occurring subsequent to installing the certificate bundle in the storage medium;

subsequent to installing the certificate bundle in the storage medium, executing the one or more operations of the provisioning process, the one or more operations of the provisioning process relying on at least one CA certificate, of the set of one or more CA certificates, to establish the secure communication with at least one network entity associated with the virtual cloud network;

wherein the method is performed using at least one hardware device.

17. The method of claim 16, further comprising:

prior to installing the certificate bundle, performing a validation of the certificate bundle;

determining that the certificate bundle passes the validation;

wherein installing the certificate bundle in the storage medium is responsive to determining that the certificate bundle passes the validation.

18. The method of claim 16, further comprising:

sending a notification to a provisioning module executing on the cloud resource instance, the notification indicating the certificate bundle having been installed in the storage medium;

wherein the provisioning module (a) utilizes the at least one CA certificate, of the set of one or more CA certificates, to establish the secure communication with the at least one network entity associated with the virtual cloud network, and (b) performs the one or more operations of the provisioning process utilizing the secure communication.

19. The method of claim 16, further comprising:

subsequent to installing the certificate bundle in the storage medium, performing at least one subsequent provisioning operation of the provisioning process, the at least one subsequent provisioning operation comprising at least one of:

sending, to a service agent executing on the cloud resource instance, a notification comprising a location of the certificate bundle in the storage medium; or sending the certificate bundle to the service agent.

20. The method of claim 16, further comprising:

performing at least a first provisioning operation of the provisioning process prior to detecting the certificate bundle-retrieval trigger;

subsequent to installing the certificate bundle in the storage medium, performing at least a second provisioning operation of the provisioning process.

21. The method of claim 16, further comprising:

responsive to detecting the certificate bundle-retrieval trigger:

initiating a certificate bundle provisioning phase, comprising:

sending the request for the certificate bundle for the cloud resource instance, receiving the certificate bundle, and installing the certificate bundle;

subsequent to the certificate bundle provisioning phase:

performing the one or more operations of the provisioning process.

22. The method of claim 21, further comprising:

determining that one or more operations associated with the certificate bundle provisioning phase are complete;

responsive to determining that the one or more operations associated with the certificate bundle provisioning phase are complete:

performing the one or more operations of the provisioning process.

23. The method of claim 16, further comprising:

prior to detecting the certificate bundle-retrieval trigger:

performing at least one operation associated with a configuration file generation phase of the provisioning process, or performing at least one operation associated with a local environment setup phase of the provisioning process;

subsequent to installing the certificate bundle in the storage medium:

performing at least one operation associated with an instance parameter configuration phase of the provisioning process, or performing at least one operation associated with an instance finalization phase of the provisioning process.

24. The method of claim 16, wherein the network interface comprises a network interface card, and wherein the agent is executing on the network interface card.

25. The method of claim 16, wherein the provisioning process comprises:

initializing a security protocol at least by utilizing a first CA certificate, of the set of CA certificates, to authenticate an entity certificate of a first network entity associated with the virtual cloud network;

receiving, from the first network entity in accordance with the security protocol, a first secure communication comprising data for at least one provisioning operation of the provisioning process.

26. A system, comprising:

at least one hardware processor;

the system being configured to execute operations, using the at least one hardware processor, the operations comprising:

detecting, during a provisioning process for a cloud resource instance associated with a virtual cloud network, a certificate bundle-retrieval trigger;

responsive to detecting the certificate bundle-retrieval trigger, sending, to an agent executing on a network interface linked to the cloud resource instance, a request for a certificate bundle for the cloud resource instance;

receiving from the agent executing on the network interface, the certificate bundle for the cloud resource instance, the certificate bundle comprising a set of one or more certificate authority (CA) certificates;

installing the certificate bundle in a storage medium associated with the cloud resource instance to facilitate establishing a secure communication one or more operations of the provisioning process occurring subsequent to installing the certificate bundle in the storage medium;

subsequent to installing the certificate bundle in the storage medium, executing the one or more operations of the provisioning process, the one or more operations of the provisioning process relying on at least one CA certificate, of the set of one or more CA certificates, to establish the secure communication with at least one network entity associated with the virtual cloud network.

27. A method, comprising:

detecting, during a provisioning process for a cloud resource instance associated with a virtual cloud network, a certificate bundle-retrieval trigger, wherein a first portion of a network configuration phase of the provisioning process is performed prior to detecting the certificate bundle-retrieval trigger;

responsive to detecting the certificate bundle-retrieval trigger, sending, to an agent executing on a network interface linked to the cloud resource instance, a request for a certificate bundle for the cloud resource instance;

receiving from the agent executing on the network interface, the certificate bundle for the cloud resource instance, the certificate bundle comprising a set of one or more certificate authority (CA) certificates;

installing the certificate bundle in a storage medium associated with the cloud resource instance, wherein installing the certificate bundle represents an operation of the provisioning process;

subsequent to installing the certificate bundle in the storage medium, performing a second portion of the network configuration phase.

28. The method of claim 27, wherein the first portion of the network configuration phase comprises configuring a network interface setting, or wherein the second portion of the network configuration phase comprises configuring a security protocol setting.

* * * * *